US011873197B2

(12) United States Patent
Frommelt

(10) Patent No.: US 11,873,197 B2
(45) Date of Patent: Jan. 16, 2024

(54) LARGE CRANE WITH BOOM

(71) Applicant: LIEBHERR-WERK EHINGEN GMBH, Ehingen/Donau (DE)

(72) Inventor: Uwe Frommelt, Ehingen (DE)

(73) Assignee: LIEBHERR-WERK EHINGEN GMBH, Ehingen/Donau (DE)

( * ) Notice: Subject to any disclaimer, the term of this patent is extended or adjusted under 35 U.S.C. 154(b) by 84 days.

(21) Appl. No.: 17/254,211

(22) PCT Filed: Jun. 19, 2019

(86) PCT No.: PCT/EP2019/066175
§ 371 (c)(1),
(2) Date: Dec. 18, 2020

(87) PCT Pub. No.: WO2019/243412
PCT Pub. Date: Dec. 26, 2019

(65) Prior Publication Data

US 2021/0269286 A1 Sep. 2, 2021

(30) Foreign Application Priority Data

Jun. 20, 2018 (DE) ..................... 10 2018 114 832.1

(51) Int. Cl.
*B66C 23/82* (2006.01)
*B66C 23/18* (2006.01)
*B66C 23/68* (2006.01)

(52) U.S. Cl.
CPC .......... *B66C 23/823* (2013.01); *B66C 23/185* (2013.01); *B66C 23/68* (2013.01)

(58) Field of Classification Search
CPC ....... B66C 23/185; B66C 23/68; B66C 23/82; B66C 23/823
See application file for complete search history.

(56) References Cited

U.S. PATENT DOCUMENTS 2,529,454 A 11/1950 Marcantonio
2,975,910 A * 3/1961 Conrad .................. B66C 23/36 212/300
3,083,837 A * 4/1963 Jones ...................... B66C 23/26 212/295

(Continued)

FOREIGN PATENT DOCUMENTS

CN 1767998 A 5/2006
CN 102275833 A 12/2011

(Continued)

OTHER PUBLICATIONS

ISA European Patent Office, International Search Report Issued in Application Serial No. PCT/EP2019/066175, dated Oct. 14, 2019, WIPO, 2 pages.
Japanese Patent Office, Office Action Issued in Application No. 2020-570572, dated Jun. 13, 2023, 7 pages. (Submitted with Machine Translation).

(Continued)

*Primary Examiner* — Michael R Mansen
*Assistant Examiner* — Nathaniel L Adams
(74) *Attorney, Agent, or Firm* — McCoy Russell LLP

(57) ABSTRACT

This invention relates to a large crane with an at least two-part main boom, wherein a lower and an upper part of the main boom are pivotally coupled to each other an articulation point. The invention furthermore is directed to a method for erecting or depositing a corresponding large crane.

4 Claims, 2 Drawing Sheets

(56) References Cited

U.S. PATENT DOCUMENTS

| | | | | |
|---|---|---|---|---|
| 3,246,769 | A * | 4/1966 | Noll | B66C 23/344 212/295 |
| 3,263,383 | A * | 8/1966 | Foster | B66C 23/62 52/143 |
| 3,306,470 | A | 2/1967 | Green et al. | |
| 4,491,229 | A * | 1/1985 | Behrendt | B66C 23/702 212/347 |
| 5,842,587 | A | 12/1998 | Wanek et al. | |
| 2006/0065616 | A1* | 3/2006 | Diehl | B66C 23/90 212/300 |
| 2012/0175333 | A1* | 7/2012 | Pech | B66C 23/26 212/177 |
| 2014/0083964 | A1 | 3/2014 | Kurotsu et al. | |

FOREIGN PATENT DOCUMENTS

| | | | |
|---|---|---|---|
| CN | 103708362 | A | 4/2014 |
| CN | 104340885 | A | 2/2015 |
| DE | 102005049606 | A1 | 4/2007 |
| JP | S5422769 | U | 2/1979 |
| JP | H04277196 | A | 10/1992 |
| JP | H107388 | A | 1/1998 |
| JP | 2002255478 | A | 9/2002 |

OTHER PUBLICATIONS

National Intellectual Property Administration of the People's Republic of China, Office Action and Search Report Issued in Application No. 201980041852.6, dated Jun. 12, 2023, 18 pages. (Submitted with Partial Translation).

* cited by examiner

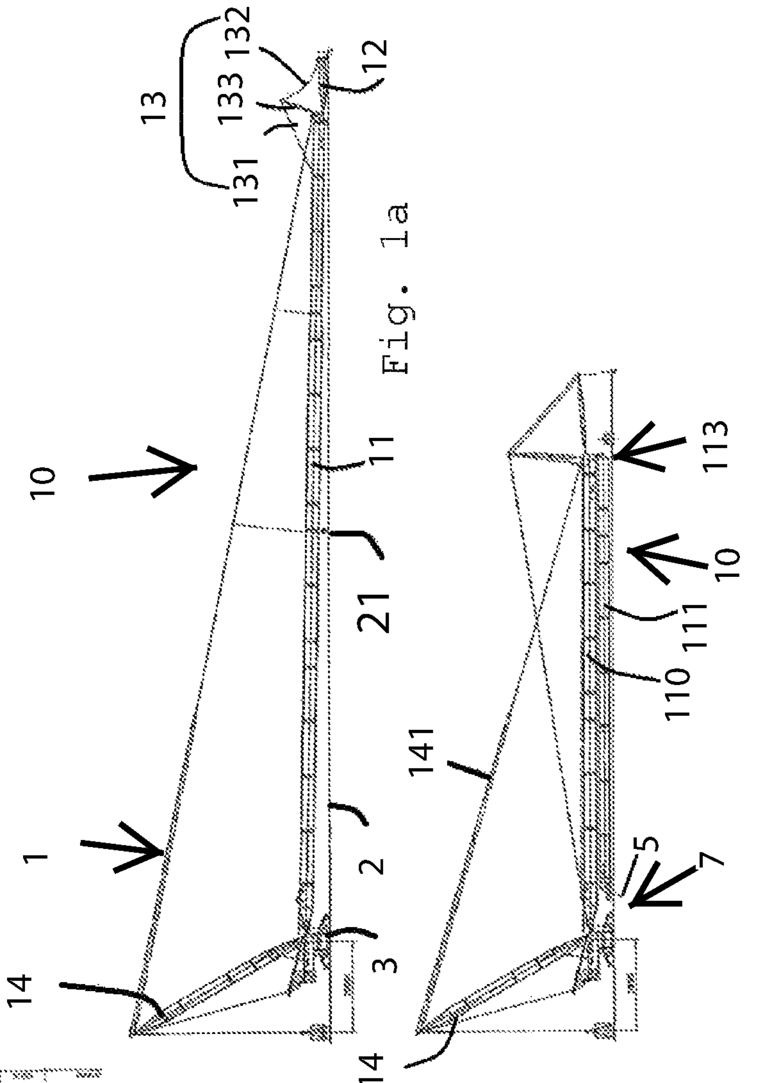
Fig. 1a
Fig. 1b
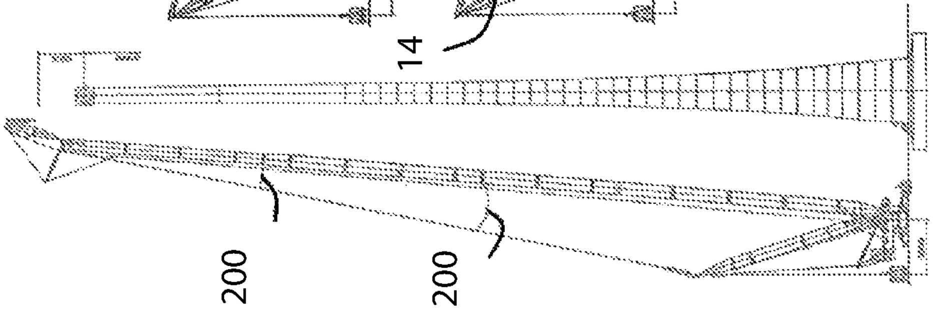
Fig. 1c
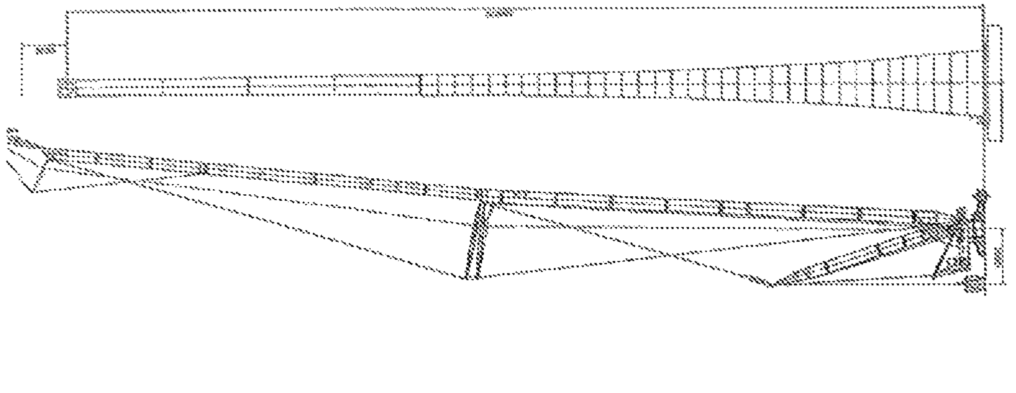
Fig. 1d

LARGE CRANE WITH BOOM

CROSS REFERENCE TO RELATED APPLICATIONS

The present application is a U.S. National Phase of International Application No. PCT/EP2019/066175 entitled "LARGE CRANE WITH BOOM," and filed on Jun. 19, 2019. International Application No. PCT/EP2019/066175 claims priority to German Patent Application No. 10 2018 114 832.1 filed on Jun. 20, 2018. The entire contents of each of the above-listed applications are hereby incorporated by reference for all purposes.

TECHNICAL FIELD

This invention relates to a large crane with an at least two-part main boom, wherein a lower and an upper part of the main boom are pivotally coupled to each other at an articulation point.

BACKGROUND AND SUMMARY

The erection of long lattice booms of large cranes requires much space. Especially the distance from the boom tip to the undercarriage of the large crane is large, as it must be possible to deposit the boom on the ground in its entire stretched length.

This entire length must be cleared correspondingly to provide the components of the boom. In forested regions, the entire area must be deforested therefor correspondingly. As the lattice pieces of the boom are to be moved from a truck to the desired position in the boom and are to be unloaded there by an auxiliary crane, the deforested lane must also have a sufficient width.

FIG. 1*a* shows a mobile crane 1 which can include a tracklaying gear or a wheeled chassis. The crane 1 has a boom system 10. The boom system 10 consists of a main boom 11 which is constructed of a plurality of lattice pieces. There is also provided a derrick boom 14.

At its free end, a fly jib 12 is articulated to the main boom 11. The fly jib 12 can be pivotally connected to the main boom 11. Before the erection of the boom system 10, the slewing angle is adjusted via a holding system 13. The holding system 13 can consist of a bracing, 131 and 132, and of at least one bracing support 133.

According to the erection system known from the prior art, the length or ground area shown in FIG. 1*a* is required. Correspondingly, the ground 2 on which the crane is erected can be seen in FIG. 1*a*. There is also shown the undercarriage 3 of the crane 1, on which the uppercarriage 4 can be rotatably mounted.

The uppercarriage 4 is connected to the boom system 10 via a boom swivel axis. This connecting point is located at a much higher level than the contact point of the boom system 10 in the region of its free end. The area between ground 2 and boom system 10 hence can be suitably propped up with spacers 21.

FIG. 1*a* shows the space needed during the assembly of wind turbines. At a required height of the hub of the wind turbine of 200 m, a hook height of 210 m is necessary. Thus, the lane required for the assembly of the crane has a length of more than 210 m.

In generic cranes as shown in FIG. 1*a* it is disadvantageous that, as described above, the same require a large area for erecting or depositing the main boom, which in particular in forest areas leads to deforesting on a correspondingly large surface area.

Against this background it is the object of the invention to provide an improved large crane, in which a smaller surface area is required for the assembly or disassembly of the crane.

According to the invention, this object is achieved by a large crane with the features of claim 1. Advantageous embodiments are subject-matter of the sub-claims.

According to the invention it is provided that the lower part and the upper part of the main boom are equipped to lie one above the other, in particular one on top of the other, in a deposited state of the main boom.

By correspondingly swivelling in the two parts of the main boom, the area required for the assembly or disassembly of the large crane can be halved approximately.

In a preferred embodiment of the invention it is conceivable that in the region of the articulation point an articulation point bracing is provided, which is equipped to brace the main boom in an erected and/or partly erected state. The pivotally designed main boom thus can be stabilized and can be prevented from tipping over or being damaged in particular also while the main boom is swivelled out or in.

In a particularly preferred embodiment it is conceivable that the articulation point bracing is pivotally arranged relative to the main boom.

In another particularly preferred embodiment it is conceivable that the articulation point bracing comprises two bracing supports which are articulated to the lower part of the main boom.

In another preferred embodiment it is conceivable that the upper part of the main boom comprises a carriage at its outermost portion, which is equipped to traverse the main boom on the ground when the same is erected and/or deposited. The carriage introduces at least a part of the weight force of the main boom into the underground and thereby facilitates the erection or deposition of the main boom.

In a particularly preferred embodiment it is conceivable that the carriage is articulated to a fly jib. The fly jib itself can be pivotally articulated to the upper part of the main boom. The carriage can of course be releasably connected to the fly jib and, for example when lifting or depositing the upper part of the main boom, can be connected to the fly jib or be separated from the same.

Alternatively, the aforementioned carriage can also be replaced by at least one connecting point, in addition to the articulation point, between the upper and the lower part of the main boom. Such a connection is produced temporarily for erecting and/or depositing the main boom, whereby the upper part of the main boom is attached to the lower part of the main boom while the same is erected or deposited. The connection then is released near the ground at a suitable time. Preferably, the upper part is attached to the lower part of the main boom with its outer (free) end portion. When a fly jib is present, the connecting point can also be provided between the fly jib and the lower part of the main boom.

Hence, two carriages may exist in one design variant. On the one hand the main boom and on the other hand the fly jib are to be accommodated. As a substitute for a carriage, a roller might also be arranged on the fly jib. Moreover, the same carriage might first be used for the main boom and then for the fly jib.

In another preferred embodiment it is conceivable that the upper part is shorter than the lower part of the main boom. It hence is easier to arrange the main boom in a deposited state such that the lower part rests on the upper part, while the lower part at the same time is connected to the uppercarriage of the crane. Due to the shorter design of the upper part of the main boom it is prevented that in this deposited state the main boom collides with the undercarriage and/or upper carriage of the crane via its upper part.

The invention furthermore is directed to a method for erecting or depositing an at least two-part main boom of a large crane according to any of claims 1-6. The method comprises the following steps:

- providing the lower part of the main boom in a horizontal position;
- providing the upper part of the main boom in a horizontal position beside or below the lower part; and
- jointly pivoting the upper and the lower part between the erected state and the deposited state of the main boom.

The first two steps of providing the respective parts can be effected at the same time or almost at the same time. Depending on whether the main boom is deposited or erected, the steps can of course be carried out in a correspondingly different order.

In a preferred embodiment it is conceivable that the upper part is mounted and/or demounted below or beside the lower part.

In another preferred embodiment it is conceivable that a fly jib is mounted to or demounted from the main boom in a partly erected state of the main boom.

BRIEF DESCRIPTION OF THE FIGURES

Further details and advantages of the invention will be explained with reference to the exemplary embodiments shown in the Figures. In the drawing:

FIG. 1*a*: shows a large crane known from the prior art in a deposited state;

FIG. 1*b*: shows a large crane according to the invention in a deposited state;

FIG. 1*c*: shows a large crane known from the prior art in an erected state;

FIG. 1*d*: shows a large crane according to the invention in an erected state;

DETAILED DESCRIPTION

Figures 2A, 2B, 2C, 2D, 2E:
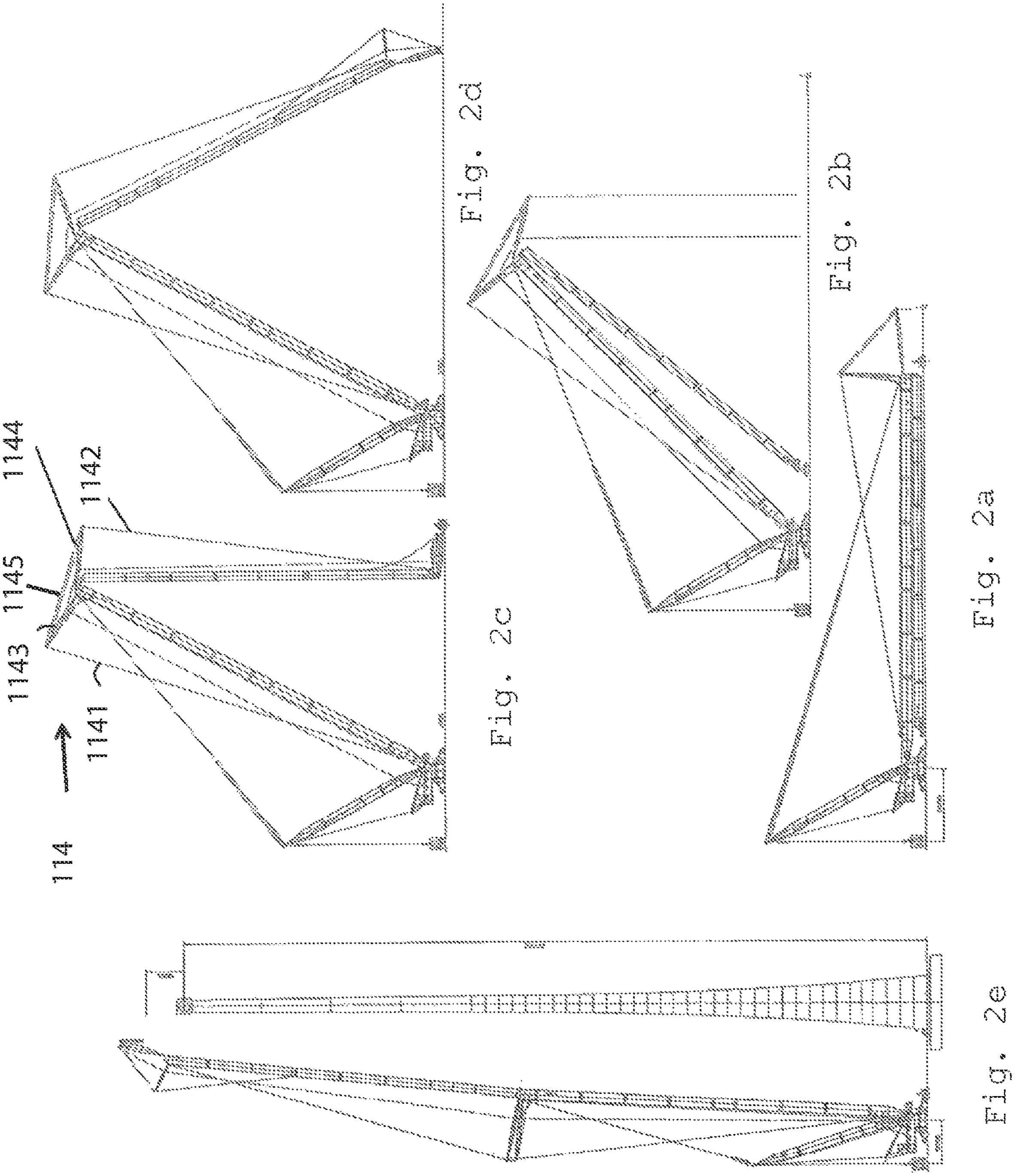
FIGS. 2*a*-2*e*: show the erection or deposition of a large crane according to the invention.

FIG. 1*b* shows a large crane according to the invention in a state with a deposited main boom 11. Here, it can be seen that the space required for assembly according to the invention is very much shorter when using the method or crane according to the invention.

According to the invention, the main boom 11 of the boom system 10 has an articulation point 113. This articulation point 113 divides the main boom 11 into a lower part 110 and an upper part 111. The lower part 110 is arranged closer to the uppercarriage 4 or coupled directly to the uppercarriage 4. The upper part 111 is coupled to the uppercarriage 4 of the large crane by means of the lower part 110.

Thus, a so-called "erection flipped down" can be realized. First of all, the upper part 111 is assembled from the individual lattice pieces while lying on the ground or being suitably supported. The free end of the main boom 11 is located in the vicinity of the undercarriage 3. Thereafter, the lower part 110 is assembled from the individual lattice pieces. The lattice pieces of the lower part 110 can be supported on the lattice pieces of the upper part 111. The articulation piece of the main boom 11 is connected to the uppercarriage 4 at its swivel axis.

Alternatively, the lattice pieces of the lower part 110 might also at least partly be mounted beside the upper part 111. Thereafter, they would then be lifted by means of the bracing 141 and be swivelled into their mounting position on the upper part 111. For this purpose, the crane lifts the lower part. The lower part 110 and the upper part for example are connected by means of a cable. Hence, the upper pan 111 also is lifted. As the upper part is shorter, the same rotates about its contact surface on the ground and swivels below the lower part 110 of the main boom.

The erection method of the invention also requires a derrick boom 14 or at least an erecting trestle. As is known from the prior art, the connection between derrick boom 14 and main boom 11 serves as luffing drive 141 of the boom system 10 about its swivel axis. Hence it is variable in length. During crane operation, the angle of the derrick boom 14 generally remains unchanged. It can, however, also be adaptable.

The use of the method of the invention only with an erecting trestle represents a subordinate alternative. The lengths in boom systems which can be erected only by means of the erecting trestle and hence with a smaller lever arm are not problematic as such. Accordingly, the erecting trestle or the derrick boom can serve as the only erecting element for the main boom 11, depending on the length of the boom system.

In contrast to the systems known from the prior art, the lulling drive 141 is connected to the lower part 110 of the main boom 11 in the region of the articulation point 113. To erect the boom system 10, a winch retracts the luffing drive 141. The lower part 110 of the main boom 11 luffs up about its swivel axis. The same entrains the upper part 11 at the articulation point 113. The free end of the main boom 11 can roll along on a carriage 5, as this is shown for example in FIG. 2*b*. The lower part 110 continues to slew, until the upper part 111 is freely or approximately freely suspended at the articulation point 113. In this condition, the fly jib 12 can be mounted with its holding system 13 at ground level. This is illustrated for example in FIG. 2*c*.

In this position, the articulation joint bracing 114 also is used. The articulation point bracing 114 consists of bracing rods 1141 and 1142 unchangeable in length, at least two bracing supports 1143 and 1144 and the length adjuster 1145. The bracing rods 1142 unchangeable in length are connected to the upper part 111 of the main boom 11.

As shown in FIG. 2*d*, the upper part 111 now can also be luffed up by retracting the length adjuster 1145. The fly jib 12 can be guided on a carriage. It continues to slew, until the holding system 13 holds it in its working angle relative to the main boom 11. By further retracting the length adjuster 1145, the main boom 11 reaches its working position which is shown in FIG. 2*e*.

As to the articulation point 113, it should be mentioned that it is located on the side of the main boom 11 facing the load. Under a tensile load, the elements lower part 110 of the main boom 11, bracing support 1143 and bracing rods 1141 unchangeable in length form a stable triangle, just like the elements upper part 111 of the main boom 11, bracing support 1144 and the bracing rods 1142 unchangeable in length. Both triangles are pulled together by the length adjuster 1145 around the articulation point in such a way that the main boom 11 is compressed on its side facing away from the load. This contact point hence can be pretensioned to a hard stop.

Alternatively, there can also be provided a resilient element like a storage cylinder/hydraulic cylinder or a spring. There is not produced a flexurally rigid connection. The load then is standing on the length adjuster 1145.

It should be noted that both bracing supports 1143 and 1144 can be articulated to the lower part 110 of the main boom 11. This is illustrated for example in FIG. 2*a*.

A frequently used additional bracing 200, as it is shown in FIG. 1*c*, can be omitted in many cases. The bracing according to the invention with its bracing trestles fulfills this task. The difference between FIG. 1*c* and FIG. 1*d* is the shortening of the rod with the free length. The articulation point 113 acts like a "knot". Nevertheless, an additional bracing theoretically might be used here as well.

In the erected state of the main boom 11, the intermediate angle between lower part 110 and upper part 111 can be a few degrees. When the angle is 0°, the drive of the upper part 111 according to the invention pulls to the rear on application of the above-mentioned pretension and bends the main boom 11 to the rear. When the intermediate angle is too large, the minimum achievable outreach (forced outreach) becomes too large and the maximum lifting capacity is negatively influenced by the lever arm.

Both parts 110, 111 can have separate protractors which transmit their data to the crane controller. Thus, all angles are always known and can be approached selectively. This is particularly advantageous when depositing the main boom 11 with the articulation point 113. The method here is carried out in reverse order. The positions hence are not always obtained automatically (e.g. hanging upper part 111), but must be controlled and approached under supervision. Further sensors also are provided for monitoring purposes. This can be force sensors and/or position sensors.

During the assembly of the two main boom parts, chains can be used for aligning the two parts 110, 111. When aligning the two main boom parts 110, 111 receptacles may also become necessary for pre-centering. Both parts to be assembled are very large and heavy, so that suitable stops and guide plates might be mounted on the one part into which the protrusions of the other main boom part enter and, during further lifting, run along the guide plates and align the two parts relative to each other.

The articulation points of the bracing and the position of the "knot" main boom 11 formed by the articulation point 113 are to be suitably chosen from a static point of view. In this way, the maximum achievable length of the boom system can yet be increased.

POSITION NUMBERS crane 1
boom system 10
main boom 11
lower part 110
upper part 111
articulation point 113
articulation point bracing 114
bracing rods 1141 and 1142 unchangeable in length
bracing supports 1143 and 1144
length adjuster 1145
fly jib 12
holding system 13
bracing 131 and 132
bracing support 133
derrick boom 14
luffing drive 141
ground 2
spacers 21
undercarriage 3
uppercarriage 4
carriage 5

The invention claimed is:

1. A method for erecting or depositing a crane, the method comprising the following steps:
- providing a lower part of a main boom in a horizontal position;
- providing an upper part of the main boom in a horizontal position stacked with the lower part, wherein the lower part and the upper part pivotally coupled to each other at an articulation point positioned on a first side of the main boom which faces a direction which the crane is loaded;
- pivoting the upper and the lower part between an erected state and a deposited state of the main boom to position the upper part and the lower part one above the other, and in the deposited state, the upper part of the main boom is disconnected from a second bracing rod; and
- luffing the lower part of the main boom by retracting a luffing drive, then connecting the upper part of the main boom to the second bracing rod, and then luffing the upper part of the main boom by contracting a length adjuster of an articulation point bracing, the articulation point bracing comprising:
  - a first end of a first bracing rod connected to a first bracing support and an opposite end of the first bracing support connected to the lower part of the main boom at the articulation point,
  - a first end of the second bracing rod connected to a second bracing support and an opposite end of the second bracing support connected to the lower part of the main boom at the articulation point, and
  - the length adjuster connected to the first bracing support and the second bracing support, wherein contracting the length adjuster reduces a distance between the bracing supports, the contraction of the length adjuster brings the upper part and the lower part of the main boom into contact forming a hard stop for the articulation point, and the contraction of the length adjuster compresses a side of the main boom opposite the articulation point.

2. The method according to claim 1, wherein the upper part is mounted and/or demounted below the lower part.

3. The method according to claim 1, wherein a fly jib is mounted to or demounted from the main boom in a partly erected state of the main boom.

4. The method of claim 1, further comprising luffing the lower part of the main boom by retracting a luffing drive, the luffing drive attached to a derrick boom or an erecting trestle at a first end and the lower part of the main boom at a second end.

* * * * *